United States Patent
Jha

(10) Patent No.: US 11,032,169 B2
(45) Date of Patent: *Jun. 8, 2021

(54) SYSTEM AND METHOD FOR SERVERLESS MONITORING

(71) Applicant: Capital One Services, LLC, McLean, VA (US)

(72) Inventor: Maharshi Jha, Falls Church, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/749,218

(22) Filed: Jan. 22, 2020

(65) Prior Publication Data

US 2021/0044508 A1 Feb. 11, 2021

Related U.S. Application Data

(63) Continuation of application No. 16/535,483, filed on Aug. 8, 2019, now Pat. No. 10,608,903.

(51) Int. Cl.
*G06F 9/50* (2006.01)
*H04L 12/26* (2006.01)
(Continued)

(52) U.S. Cl.
CPC .......... *H04L 43/04* (2013.01); *G06F 9/5072* (2013.01); *G06F 9/5083* (2013.01); *H04L 47/70* (2013.01); *H04L 67/10* (2013.01)

(58) Field of Classification Search
CPC ..... G06F 9/5072; G06F 9/5083; H04L 43/04; H04L 47/70; H04L 67/10; H04L 67/1095;
(Continued)

(56) References Cited

U.S. PATENT DOCUMENTS

2012/0179824 A1* 7/2012 Jackson .............. G06F 9/5072
 709/226
2015/0052247 A1* 2/2015 Threefoot ............. H04L 67/10
 709/225

(Continued)

OTHER PUBLICATIONS

Screen captures from YouTube video clip entitled "Serverless data collection with Amazon Kinesis and AWS Lambda," 23 pages, published on Mar. 1, 2017 by user "Cloud Academy". Retrieved from Internet: <<https://www.youtube.com/watch?v=G7ZY8Pak-6w>>.

(Continued)

*Primary Examiner* — Le H Luu
(74) *Attorney, Agent, or Firm* — Jeffri A. Kaminski; Venable LLP

(57) ABSTRACT

Systems, methods, and computer-readable storage media for routing event data from cloud-based sources to various service providers without using a permanently dedicated server (or similar solution). The solution disclosed herein is source agnostic, meaning that the data being received can be from any provider of cloud-based data, with the data received being in a format specific to the given provider. The system can normalize the data from the respective sources into a common format based on properties on the data and, based on the normalized data, identify what type of analysis, process, or other service should be executed on data received. The system can then forward the data to respective service providers for the execution of those services.

20 Claims, 5 Drawing Sheets

(51) Int. Cl.
*H04L 29/08* (2006.01)
*H04L 12/911* (2013.01)

(58) Field of Classification Search
CPC . H04L 12/4641; H04L 41/12; H04L 41/5009; G06N 20/00; H04M 15/44
See application file for complete search history.

(56) References Cited

U.S. PATENT DOCUMENTS

| | | | |
|---|---|---|---|
| 2017/0279970 A1* | 9/2017 | Dyer | H04M 15/44 |
| 2018/0060106 A1* | 3/2018 | Madtha | H04L 41/12 |
| 2018/0123964 A1* | 5/2018 | Kore | H04L 41/5009 |
| 2018/0139075 A1* | 5/2018 | Doherty | H04L 12/4641 |
| 2019/0182124 A1* | 6/2019 | Jeuk | G06N 20/00 |
| 2019/0268421 A1* | 8/2019 | Markuze | H04L 67/10 |
| 2019/0306240 A1* | 10/2019 | Crofton | H04L 67/1095 |

OTHER PUBLICATIONS

Roy Arsan; "Announcing new AWS Lambda Blueprints for Splunk"; Retrieved from Internet: <https://www.splunk.com/blog/2016/11/29/announcing-new-aws-lambda-blueprints-for-splunk.html>; 9 pages.
Roy Arsan; "How to stream AWS CloudWatch Logs to Splunk (Hint: it's easier than you think)"; Retrieved from Internet: <https://www.splunk.com/blog/2017/02/03/how-to-easily-stream-aws-cloudwatch-logs-to-splunk.html>; 14 pages.

* cited by examiner

SYSTEM AND METHOD FOR SERVERLESS MONITORING

CROSS-REFERENCE TO RELATED APPLICATIONS

This application is a continuation of U.S. patent application Ser. No. 16/535,483, filed on Aug. 8, 2019, the content of which is hereby incorporated by reference in its entirety.

BACKGROUND

1. Technical Field

The present disclosure relates to serverless monitoring, and more specifically to routing cloud-based event objects and logs to service providers without a dedicated server.

2. Introduction

How to appropriately route network traffic is a frequent problem with any network-based software, and that problem is only compounded when data is generated by multiple sources and subsequently transmitted to distinct network locations. A common solution to this problem is to have a dedicated server or computer system which receives the data from the multiple sources, determines where the respective data should be transmitted, then forwards the data. However, this dedicated, intermediary server solution requires the server be particularly configured to receive, analyze, and forward the data constantly, a solution which often results in wasted computing resources during low bandwidth periods and insufficient computing resources during high bandwidth periods. In addition, having a server configured in this manner fails to provide adaptability when the sources and/or destinations of the data change.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media a technical solution to the technical problem described. A method for performing the concepts disclosed herein can include: receiving, at a server, from a plurality of cloud providers, a plurality of event objects, the plurality of event objects each having properties and being from distinct cloud providers within the plurality of cloud providers; identifying, via a processor of the server, for each event object in the plurality of event objects, based on the properties of the event object, a source cloud provider from which the event object was received; normalizing, via a processor of the server, each event object in the plurality of event objects via a plurality of handlers respectively associated with the plurality of cloud providers, resulting in normalized event objects; determining, via a processor of the server, for each normalized event object in the normalized event objects based on metadata of the normalized event object, a service to be executed on the normalized event object, resulting in a determined service for each normalized event object in the normalized event objects; selecting, for each normalized event object in the normalized event objects, a service provider from a plurality of service providers, the service provider being associated with the determined service for the normalized event object, resulting in a selected service provider for each normalized event object; and forwarding, from the server, for each normalized event object in the normalized event objects, the normalized event object to the selected service provider for the normalized event object.

A system configured to perform the concepts disclosed herein can include a processor; and a non-transitory computer-readable storage medium having instructions stored which, when executed by the processor, cause the processor to perform operations including: receiving a plurality of normalized event logs, wherein the plurality of normalized event logs are from a plurality of cloud providers, each cloud provider in the plurality of cloud providers distributing event logs in a particular format, the plurality of normalized event logs comprising the event logs normalized into a common format; selecting for each normalized event log in the normalized event logs based on a configuration of the normalized event log, at least one service to be executed using the normalized event log, resulting in selected services for the normalized event logs, and resulting in at least one selected service for each normalized event log in the normalized event logs; identifying, for each selected service in the selected services, a service provider, resulting in identified service providers; and transmitting the normalized event logs to the identified service providers, such that each normalized event log in the normalized event logs is transmitted to the at least one selected service associated with the normalized event log.

A non-transitory computer-readable storage medium configured as disclosed herein can have instructions stored which, when executed by a computing device, cause the computing device to perform operations which include: receiving a plurality of event logs from a plurality of cloud computing providers; retrieving, based on the receiving of the plurality of event logs, a configuration file, the configuration file containing programming to alter the computing device to: identify for each event log in the plurality of event log a source cloud computing provider from which each event log was received; normalize each event log in the plurality of event logs based on the source cloud computing provider for each event log, resulting in normalized event logs; determine for each normalized event log in the normalized event logs based on metadata of the normalized event log, a service to be executed on the normalized event log, resulting in a determined service for each normalized event log in the normalized event logs; and forward each normalized event log in the normalized event logs to a service provider associated with the determined service for the normalized event log; and modifying the computing device using the configuration file.

DETAILED DESCRIPTION

Figure 1:
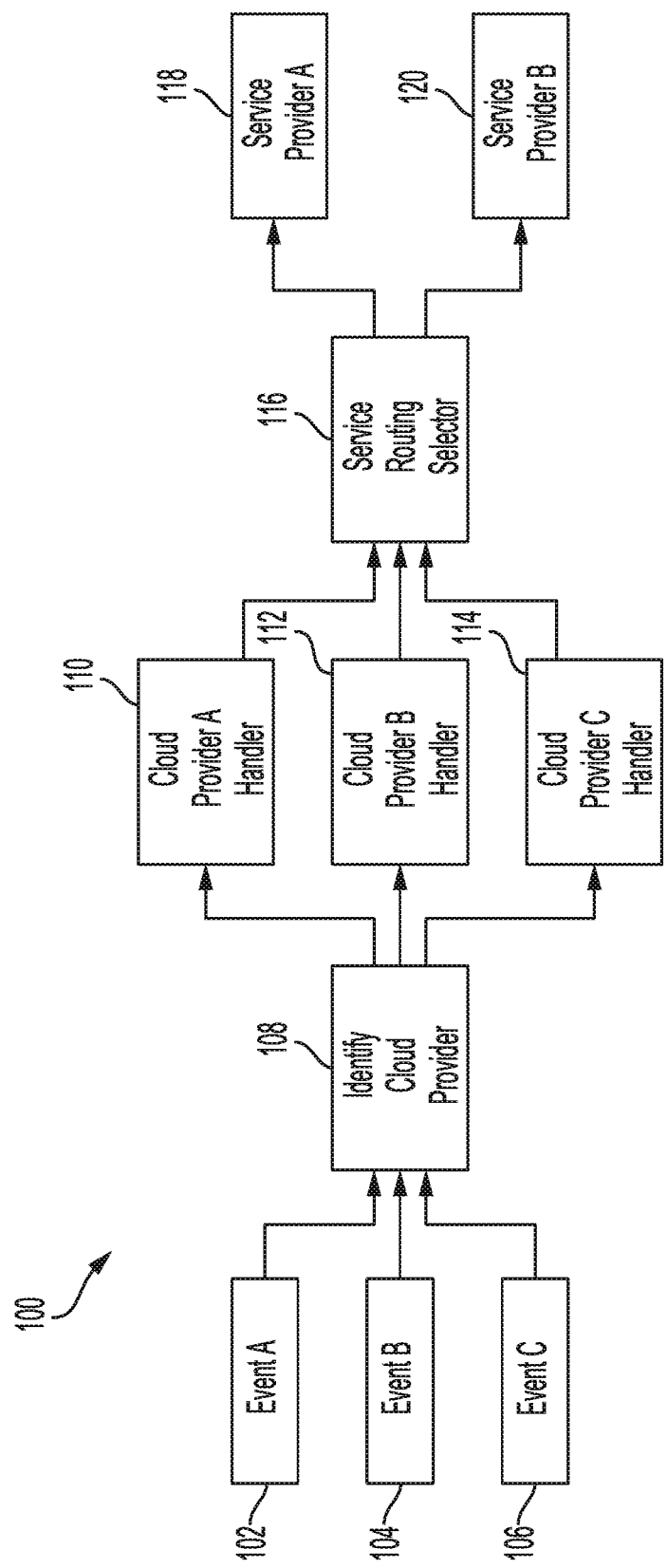
FIG. 1 illustrates a first example system embodiment.

Various embodiments of the disclosure are described in detail below. While specific implementations are described, it should be understood that this is done for illustration purposes only. Other components and configurations may be used without parting from the spirit and scope of the disclosure.

The present disclosure is directed to methods, systems, and non-transitory computer-readable media for routing event data from cloud-based sources to various service providers without using a dedicated server, such as a permanently dedicated server, (or similar solution). While servers and computing resources can be used to direct the routing of the event data, the lack of a permanently dedicated server is herein being referred to as "serverless." The solution disclosed herein is source agnostic, meaning that in some embodiments the data being received can be from any provider of cloud-based data, with the data received being in a format specific to the given provider. The system can normalize the data from the respective sources into a common format based on properties on the data and, based on the normalized data, identify what type of analysis, process, or other service should be executed on data received. The system can then forward the data to respective service providers for the execution of those services.

Consider the following example. Event logs are received from distinct cloud-computing systems (such as, for example, AWS (AMAZON Web Services), AZURE (MICROSOFT's cloud computing service), or GOOGLE Cloud Platform) on a platform server, a "serverless" server, or at a dedicated server which stores and/or analyzes the data while a distinct server is spun up using a particular configuration file. Upon receiving the event logs, a configuration file is selected which can configure the server to normalize the event logs from the distinct cloud-based platforms using cloud-specific libraries. The modified, configured server can then normalize the event logs and analyze the normalized event logs to determine what type of service should be performed on the event log. Exemplary, non-limiting services which could be performed on the event logs include using the logs as part of a data analysis (e.g., big data processing), storing the logs in a database, filtering aspects of the data, etc. Upon identifying the services to be performed on the respective logs, the server can forward or transmit the logs to the service provider. The logs forwarded to the service provider can be the normalized logs or the original (non-normalized) logs. In addition, the forwarding of the logs to the service providers can be done sequentially, as the services for the respective logs are identified, or can be done in parallel.

One exemplary, non-limiting, practical application of this solution is to route data, such as event logs, from cloud-based platforms without having a dedicated server for the routing. Instead, upon receiving the data from the cloud-based platforms a temporary server can be configured to process and route the data, at which point the server can be released to perform other tasks. In addition, when the system is configured to process (e.g., normalize) and/or transmit data to multiple service providers in parallel, the system can operates more efficiently than if the system were sequentially processing the data and/or transmitting the data. This solution also decouples the server logs from the logging server, and because of that decoupling the impact to the application execution is removed.

Additional examples and variations are provided in the figures, and these variations shall be described herein as the various embodiments are set forth.

FIG. 1 illustrates a first example system embodiment 100. In this example 100, cloud-based computer operations are executed, producing event objects 102, 104, 106. Exemplary event objects can include event logs or other event data. For example, the system can handle JSON (JavaScript Object Notation) events and other events. In some embodiments, the respective events can be handled as plain text, however it is noted that the system is not limited to any particular event type. As the event objects 102, 104, 106 are received, the system analyzes 108 the event objects to identify the cloud provider from which the respective event objects 102, 104, 106 are received. For example, some of the event objects 102, 104, 106 may come from AWS, some may come from AZURE, and still others may come from GOOGLE Cloud Platform. The system can identify the cloud provider based on the configuration and the source of the event objects 102, 104, 106. The configuration file can have a mapping which identifies both the source and the destination of a given event object.

Once the system has identified 108 the source cloud provider for a given event object, the system sends the respective event object 102, 104, 106 to a handler 110, 112, 114 which is configured to normalize the event object 102, 104, 106 based on its source. In some configurations, the handlers 110, 112, 114 do not modify the event, and instead map the event with a given service provider based on the configuration of the handler 110, 112, 114. Upon normalizing the event objects, the system sends the normalized event objects to a service routing selector 116. The service routing selector 116 identifies what type of service, or action, should be performed on the event log (either the normalized event log, or the original "non-normalized" event log), then forwards the event log to a service provider 118, 120 configured to perform or execute that service. For example, the service routing selector 116 may determine that certain event logs should be sent to a certain service provider (such as SPLUNK) for "big data" analysis using regression, Monte Carlo analysis, etc., whereas other event logs are sent to a distinct service provider (such as ELK) for services such as recording the event log in a database. Other data which could be forwarded to the service provider can include application logs, load balancer logs, error logs, etc.

To determine what service should be executed on each respective event object, the service routing selector 116 can identify information about the event object and use that information to decide where the event object should be forwarded. Exemplary, non-limiting examples of the information which can be obtained about the event object can include the source cloud provider from which the event object was received, the time of day when the event object was received, the size of the event object, a type of operation executed to create the event object, a bandwidth used to communicate the event object, a user associated with the creation of the event object, etc. Using these factors, the service routing selector 116 can determine what service should be executed on the event object. In some embodiments, the service routing selector 116 can generate an importance score for the event log based on these and other factors, and establish guidelines for services based on meeting predetermined importance level scores. For example, an importance level score can be generated based on a tag, metadata, or configuration of the event log. In some cases, a certain service may require a predefined threshold importance level score required for the service, whereas another service may have predefined threshold importance level minimum and maximum scores. If, in a particular configuration, importance is not scored, the system can determine where to route a particular event log based on the configuration of the event log. In some cases, distinct event objects from a single cloud provider can be sent to distinct service providers 118, 120, such that the system is diverting different pieces of event object data from a single cloud provider to distinct service providers.

Figure 2:
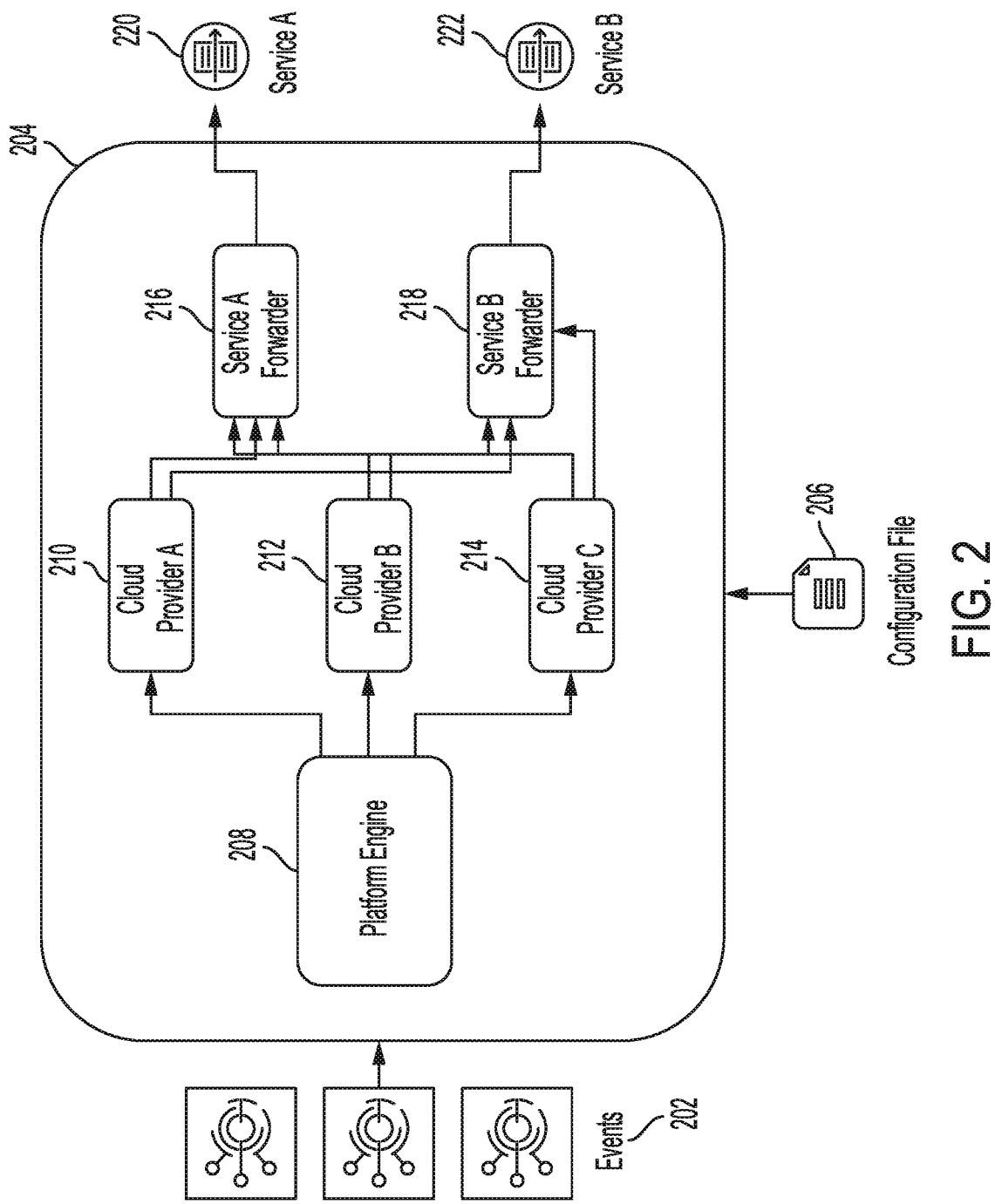
FIG. 2 illustrates a second example system embodiment.

FIG. 2 illustrates a second example system embodiment. In this example, events 202 occur at various cloud-based platforms, and event objects associated with those events 202 are received at a computing system 204. For example, the computing system 204 can be a server or other computer configured to receive data from multiple cloud providers. The computing system 204 can be, upon receiving the event objects associated with the events 202, modified or configured using a configuration file 206 which is specific to the data being received. For example, the configuration file 206 can be specific to the cloud providers from which the data is being received. For example, if event objects are not being received from a certain cloud provider, the configuration file 206 can be selected such that normalization tools associated with that cloud provider are excluded/not present.

Within the computing system 204 is a platform engine 208 which receives the event objects and identifies their origination based on metadata properties associated with each event object. As illustrated, each event object is normalized based on the cloud provider 210, 212, 214 from which it was received, then given to a service forwarder 216, 218. The service forwarders 216, 218 are, in this embodiment, configured to forward the event objects to respective service providers 220, 222 associated with a particular service. Accordingly, as illustrated, after the event objects are normalized 210, 212, 214 based on their originating cloud provider, they are given to a particular service forwarder 216, 218 based on the service to be executed on the event log. The service forwarders 216, 218 then transmit the event objects to the respective services 220, 222. The service forwarders 216, 218, as illustrated are part of the computing system 204. As such, they can be encoded into a processor configured to perform other functions, or can be electrically connected to one or more processors within the computing system 204. The forwarded event objects can be the original event objects, or the normalized event objects, depending on the configuration.

Figure 3:
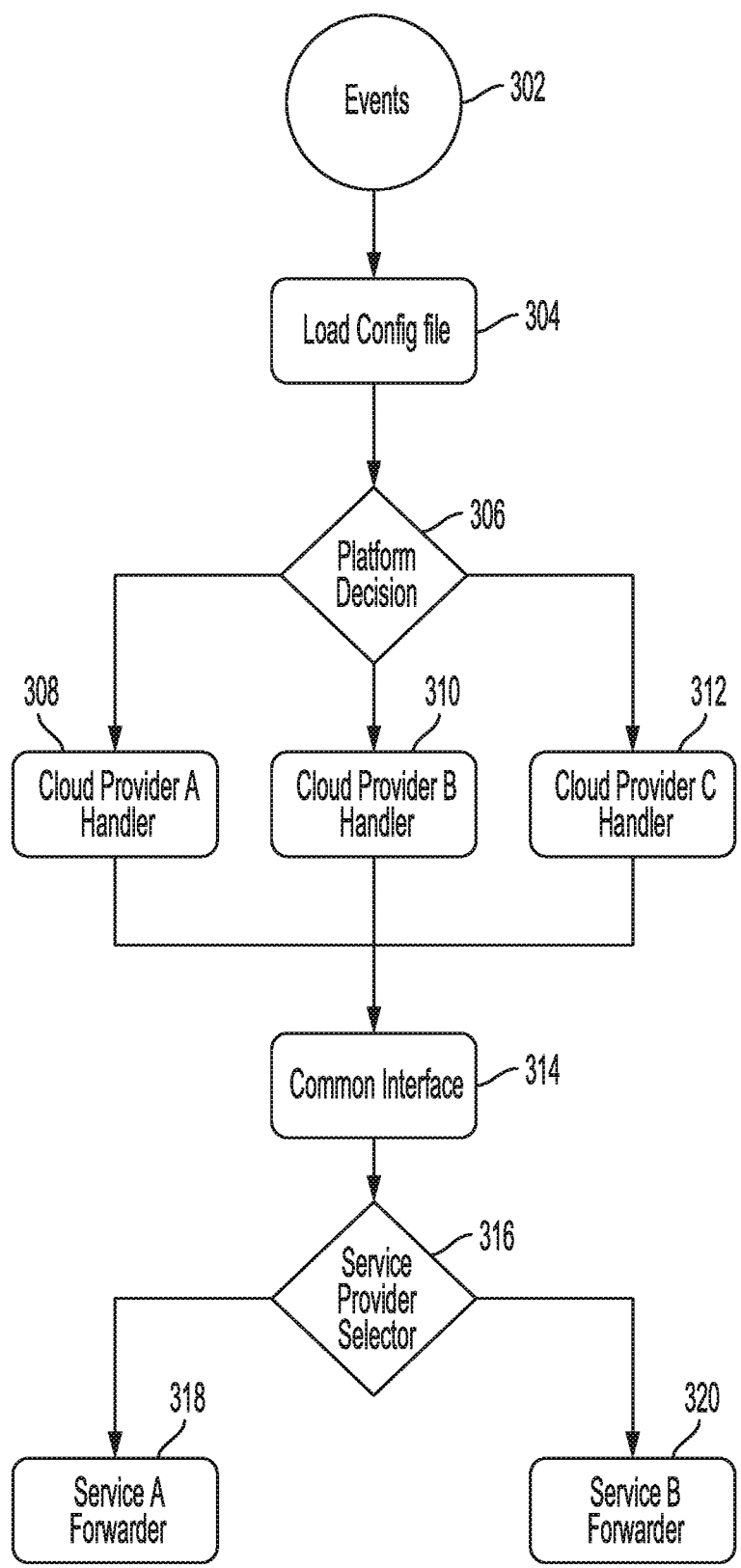
FIG. 3 illustrates a third example system embodiment.

FIG. 3 illustrates a third example system embodiment. In this example, events 302 occur at cloud-based providers, and data associated with the events 302 is received by a computer system or computing device, such as a platform server. The computer system loads a configuration file 304, and (using the updated configuration), makes a platform decision 306 regarding the data received. Event objects received from respective cloud providers are distributed to handlers 308, 310, 312 associated with those respective cloud providers. The handlers 308, 310, 312 can, for example, normalize and process the data received. The normalized, processed event objects/data is then sent to a common interface 314. The common interface 314 allows for a standard protocol across multiple different service providers. The event objects/data can then be sent to a service provider selector 316, where services associated with the respective event objects and/or data can be determined. The platform decision 306, the common interface 314, and the service provider selector 316 can be part of a common computing system, or can be part of a distributed computing system with each component 306, 314, 316 electrically connected to one another. For example, a distributed computing system can occur across a cloud-based computing system, where the respective components 306, 314, 316 are being executed on distinct servers electrically connected in a cloud-based system. From the service provider selector 316, the event objects and/or data are forwarded to service forwarder 318, 320 specific to the service identified for a given event object/data. The service forwarders 318, 320 can then transmit or otherwise forward the event objects/data to service providers.

Figure 4:
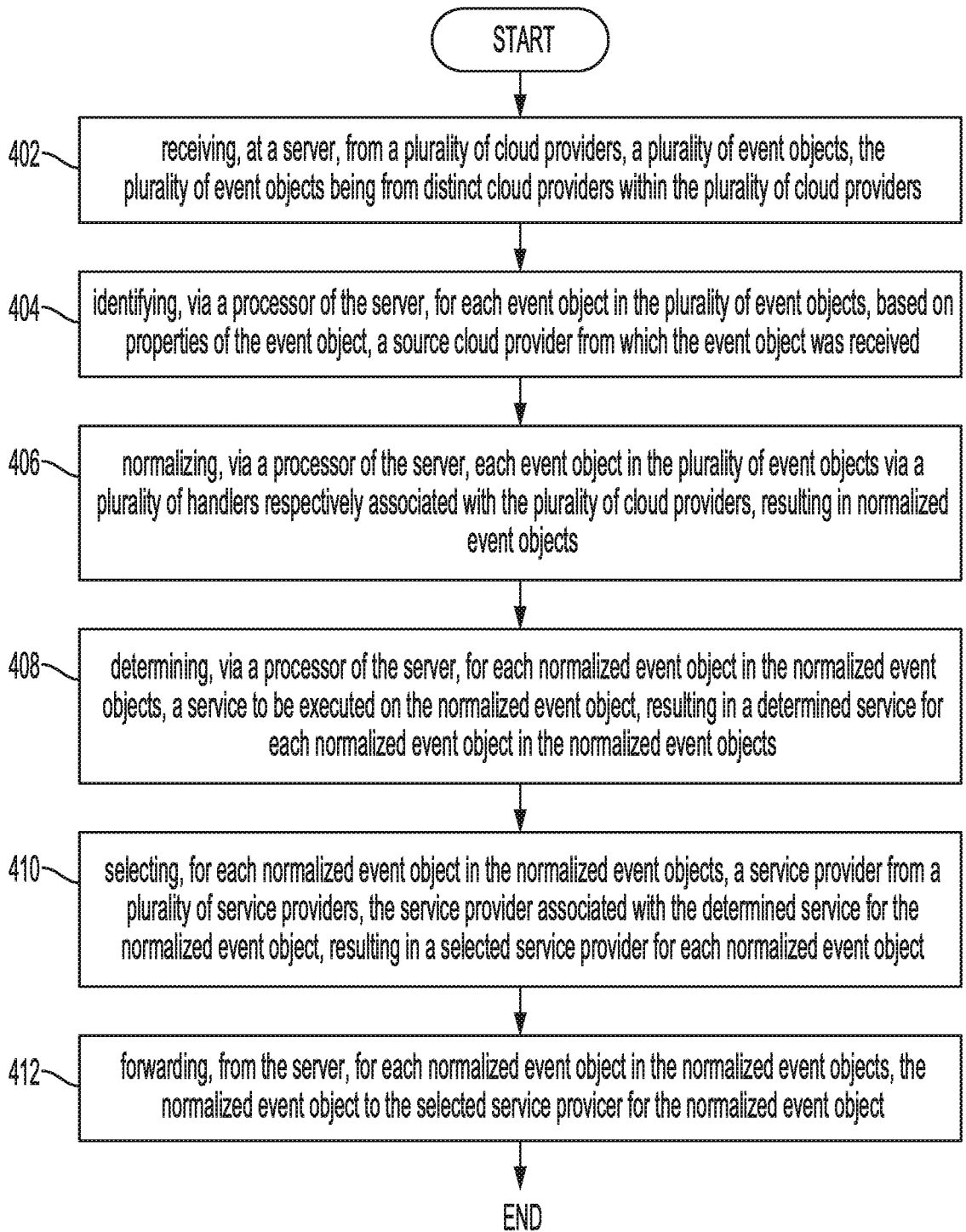
FIG. 4 illustrates an example method embodiment.

FIG. 4 illustrates an example method embodiment. The steps outlined herein are exemplary and can be implemented in any combination thereof, including combinations that exclude, add, or modify certain steps. As illustrated, the method includes receiving, at a server, from a plurality of cloud providers, a plurality of event objects, the plurality of event objects each having properties and being from distinct cloud providers within the plurality of cloud providers (402), and identifying, via a processor of the server, for each event object in the plurality of event objects, based on the properties of the event object, a source cloud provider from which the event object was received (404). The method continues by normalizing, via a processor of the server, each event object in the plurality of event objects via a plurality of handlers respectively associated with the plurality of cloud providers, resulting in normalized event objects (406), and determining, via a processor of the server, for each normalized event object in the normalized event objects, a service to be executed on the normalized event object, resulting in a determined service for each normalized event object in the normalized event objects (408). The method then can include selecting, for each normalized event object in the normalized event objects, a service provider from a plurality of service providers, the service provider being associated with the determined service for the normalized event object, resulting in a selected service provider for each normalized event object (410) and forwarding, from the server, for each normalized event object in the normalized event objects, the normalized event object to the selected service provider for the normalized event object (412).

In some configurations, the illustrated method can further include determining, via a processor of the server, a level of importance of the normalized event object, where the determining of the service to be executed on the normalized event object is based on the level of importance of the normalized event object. In such configurations, the level of importance of the normalized event object can be based, at least in part, on an identification of the cloud provider in the cloud providers from which the associated event object was received. As another example, in such configurations the level of importance of the normalized event object can be based, at least in part, on a time of day when the associated event object was received and an event type of the normalized event object.

Exemplary services to be executed can include at least one of data analytics and data recording.

In some configurations, each handler in the plurality of handlers use a predefined normalization function in the normalizing, the predefined normalization function configured to convert event objects from a cloud provider to a normalized event object.

In some configurations, the server is not configured to perform the identifying, the normalizing, the determining, and the forwarding until the receiving of the plurality of event objects occurs.

In some configurations, within the plurality of event objects, first event objects from a first source associated with a first cloud provider are forwarded to a first service provider within the plurality of service providers, and second event objects from the first source associated with the first cloud provider are forwarded to a second service provider within the plurality of service providers. Forwarding of the first event objects to the first service provider and the forwarding of the second event objects to the second service provider can occur simultaneously in parallel.

Figure 5:
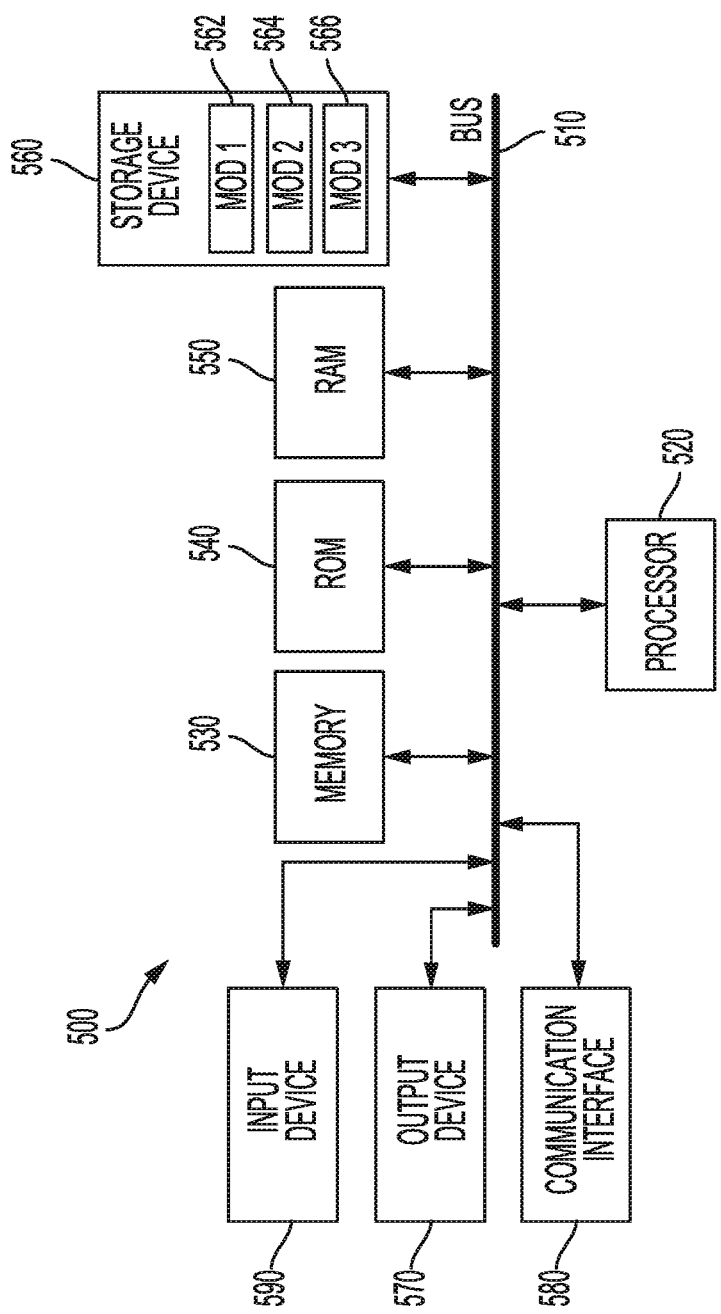
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:
1. A method comprising:
    receiving, at a server, from a plurality of cloud providers, a plurality of event objects;
    normalizing, via a processor of the server, each event object in the plurality of event objects via a plurality of handlers respectively associated with the plurality of cloud providers, resulting in normalized event objects, wherein for each event object the handler in the plurality of handlers which normalizes a respective event object is selected based on the cloud provider in the plurality of cloud providers which provided the respective event object; and
    forwarding, for each normalized event object in the normalized event objects, the normalized event object from the server to a service provider in a plurality of service providers,
    wherein the service provider is selected based on metadata of the normalized event object.
2. The method of claim 1, wherein each event object in the plurality of event objects is received from a distinct cloud provider within the plurality of cloud providers.
3. The method of claim 1, wherein each cloud provider in the plurality of cloud providers distributes event objects using a distinct format than formats of other cloud providers in the plurality of cloud providers.

4. The method of claim 1, further comprising:
determining, via the processor, a level of importance of a normalized event object,
wherein a selection of a service to be executed on the normalized event object by the service provider is based on the level of importance of the normalized event object.

5. The method of claim 4, wherein the level of importance of the normalized event object is based, at least in part, on an identification of the cloud provider in the cloud providers from which the associated event object was received.

6. The method of claim 4, wherein the level of importance of the normalized event object is based, at least in part, on a time of day when the associated event object was received and an event type of the normalized event object.

7. The method of claim 1, wherein the service provider executes at least one of data analytics and data recording on the normalized event object.

8. The method of claim 1, wherein each handler in the plurality of handlers uses a predefined normalization function in the normalizing, the predefined normalization function configured to convert event objects from a cloud provider to a normalized event object.

9. The method of claim 1, wherein the server is not configured to perform the identifying, the normalizing, the determining, and the forwarding until the receiving of the plurality of event objects occurs.

10. The method of claim 1, wherein within the plurality of event objects, first event objects from a first source associated with a first cloud provider are forwarded to a first service provider within the plurality of service providers, and second event objects from the first source associated with the first cloud provider are forwarded to a second service provider within the plurality of service providers.

11. The method of claim 10, wherein the forwarding of the first event objects to the first service provider and the forwarding of the second event objects to the second service provider occur simultaneously in parallel.

12. A system comprising:
a processor; and
a non-transitory computer-readable storage medium having instructions stored which, when executed by the processor, cause the processor to perform operations comprising:
receiving a plurality of normalized event logs, wherein the plurality of normalized event logs are from a plurality of cloud providers, each cloud provider in the plurality of cloud providers distributing event logs in a particular format, the plurality of normalized event logs comprising the event logs normalized into a common format; and
transmitting each normalized event log in normalized event logs to at least one service provider selected from a plurality of service providers, such that each respective normalized event log in the normalized event logs is transmitted to the at least one service provider based on at least one quality of the respective normalized event log.

13. The system of claim 12, wherein the at least one service provider is selected based on a level of importance of the normalized event log.

14. The system of claim 13, the non-transitory computer-readable storage medium having additional instructions stored which, when executed by the processor, cause the processor to perform operations comprising:
determining the level of importance of the normalized event log.

15. The system of claim 12, wherein each service provider executes at least one of data analytics and data recording using the normalized event log.

16. The system of claim 12, wherein normalizing the event logs into the common format occurs using a plurality of predefined normalization functions, each predefined normalization function in the plurality of predefined normalization functions configured to convert event logs from a cloud provider to a normalized event log.

17. The system of claim 12, wherein the processor is not configured to perform the transmitting until the receiving of the normalized event logs occurs.

18. The system of claim 17, the non-transitory computer-readable storage medium having additional instructions stored which, when executed by the processor, cause the processor to perform operations comprising:
upon receiving the plurality of normalized event logs, retrieving, into the non-transitory computer-readable storage medium, a configuration file, the configuration file containing the instructions for the transmitting.

19. The system of claim 12, the non-transitory computer-readable storage medium having additional instructions stored which, when executed by the processor, cause the processor to perform operations comprising:
determining a level of importance of a normalized event log,
wherein the at least one service provider is selected based on the level of importance of the normalized event log.

20. A non-transitory computer-readable storage medium having instructions stored which, when executed by a computing device, cause the computing device to perform operations comprising:
receiving a plurality of event logs from a plurality of cloud computing providers;
retrieving, based on the receiving of the plurality of event logs, a configuration file, the configuration file containing programming to alter the computing device to:
modify the computing device using the configuration file;
normalize each respective event log in the plurality of event logs based on a source cloud computing provider from which the respective event log was received, resulting in normalized event logs; and
forward each normalized event log in the normalized event logs to a service provider associated with a determined service for the normalized event log.

* * * * *